(12) United States Patent
Henning

(10) Patent No.: US 8,717,011 B2
(45) Date of Patent: May 6, 2014

(54) ACTUATOR

(75) Inventor: Daniel Henning, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 12/672,189

(22) PCT Filed: Jun. 6, 2008

(86) PCT No.: PCT/EP2008/057061
§ 371 (c)(1),
(2), (4) Date: Nov. 9, 2010

(87) PCT Pub. No.: WO2009/019055
PCT Pub. Date: Feb. 12, 2009

(65) Prior Publication Data
US 2011/0050212 A1    Mar. 3, 2011

(30) Foreign Application Priority Data

Aug. 7, 2007 (DE) .......................... 10 2007 037 215

(51) Int. Cl.
*G01B 7/30* (2006.01)
(52) U.S. Cl.
USPC .................................................... 324/207.25
(58) Field of Classification Search
USPC .................................................... 324/207.25
See application file for complete search history.

(56) References Cited

U.S. PATENT DOCUMENTS

| | | | |
|---|---|---|---|
| 6,566,864 B1 | 5/2003 | Brown et al. | |
| 7,847,446 B2 * | 12/2010 | Becker et al. | 310/68 B |
| 2003/0011506 A1 | 1/2003 | Yamada et al. | |
| 2003/0019323 A1 | 1/2003 | Babin et al. | |
| 2004/0251893 A1 | 12/2004 | Takahara | |
| 2005/0211205 A1 * | 9/2005 | Yamada et al. | 123/90.16 |
| 2008/0272660 A1 | 11/2008 | Becker et al. | |

FOREIGN PATENT DOCUMENTS

| | | |
|---|---|---|
| DE | 102005062784 A1 | 7/2007 |
| EP | 1275938 A2 | 1/2003 |
| EP | 1475525 A2 | 11/2004 |
| WO | 0218869 A1 | 3/2002 |

* cited by examiner

*Primary Examiner* — Reena Aurora
(74) *Attorney, Agent, or Firm* — Maginot, Moore & Beck

(57) ABSTRACT

In the case of an actuator having a rotation angle sensor with a magnet, no satisfying solution has yet been found for the attachment of the magnet. The invention relates to an actuator having a rotation angle sensor, the magnet of the rotation angle sensor being provided with a plastic cover. The plastic cover and magnet may be easily connected to a first sensor part of the rotation angle sensor of the actuator. The actuator with the rotation angle sensor can particularly be used in motor vehicles.

17 Claims, 3 Drawing Sheets

ACTUATOR

CROSS-REFERENCE TO RELATED APPLICATION

This application is a 35 USC 371 application of PCT/EP2008/057061 filed on Jun. 6, 2008.

BACKGROUND OF THE INVENTION

1. Field of the Invention

The invention is based on an actuator having a rotation angle sensor, and a method for manufacturing an actuator.

2. Description of the Prior Art

In a known actuator (DE 195 25 510 A1), a rotation angle sensor is provided for sensing an angular position of a rotor. Depending on the angular position of the rotor, a gas conduit extending through the housing of the actuator is opened to a greater or lesser degree by means of a throttle element connected to the rotor. In the known actuator, a first sensor part is situated on a gear connected to the rotor and a second sensor part is situated on a cover that is attached to the housing in a stationary fashion. In the actuator disclosed in DE 195 25 510 A1, the rotation angle is measured by means of moving sliders. It is, however, also possible to attach a magnet to the rotor, for example, and to attach a magnetically sensitive element to the stator. Depending on the position of the magnet of the rotor, the magnetic field acting on the magnetically sensitive element changes so that the magnetically sensitive element emits a corresponding electrical signal in accordance with the position of the rotor. Previously, the problem was the lack of a satisfactory solution for attaching the magnet to the rotor. For example, attaching the magnet to the rotor by means of screws would involve highly complex work. Casting the magnet into the plastic material of the rotor is also complex and requires a specific adaptation to different customer wishes and a significantly higher degree of complexity in the manufacture of the rotor. It is also possible to provide a deformable edge on the rotor, which is used by first placing the magnet against the rotor and then deforming the deformable edge so that the deformable edge encompasses part of the magnet, thus securing the magnet to the rotor. However, this has the disadvantage that the material normally used for the rotor, for example plastic, springs back slightly after the plastic deformation, thus resulting in play between the rotor and the magnet. As a result, the magnet can wobble somewhat in relation to the rotor. Another danger is that the deformation can change the properties of the plastic material of the rotor so that with the occurrence of temperature changes during operation of the actuator, the plastic material relaxes and as a result, the firm fit of the magnet is no longer assured. This leads to a distortion of the rotation angle sensor signal.

ADVANTAGES AND SUMMARY OF THE INVENTION

The actuator according to the invention, having the rotation angle sensor, and the method for manufacturing an actuator according to the invention have the advantage that the magnet embedded in the plastic casing can be attached very easily to the first sensor part. This connection can be produced by means of simple, proven, easy-to-implement, and very controllable manufacturing processes. The plastic casing accommodating the magnet can be very easily attached to the first sensor part, for example by means of ultrasonic welding, rotation welding, friction welding, gluing, etc.

Another advantage is that the magnet with the plastic casing can be manufactured as a blank on a mass production scale independently of the actuator, and then the mass-produced blank can be attached to various actuators. This has the advantage that in the event of a change to the actuator, no change to the actual rotation angle sensor is required.

Another advantage is that the magnet can be attached to the first sensor part without a high level of complexity by means of a method known to be reliable. A fastening method can be used in which it is known with certainty that no play between the rotor and the magnet will be produced even with the occurrence of temperature changes.

BRIEF DESCRIPTION OF THE DRAWINGS

Preferably selected, particularly advantageous exemplary embodiments of the invention are shown in simplified fashion in the drawings and will be explained in detail in the subsequent description in conjunction with the drawings, in which.

DESCRIPTION OF THE PREFERRED EMBODIMENTS

Figure 1:
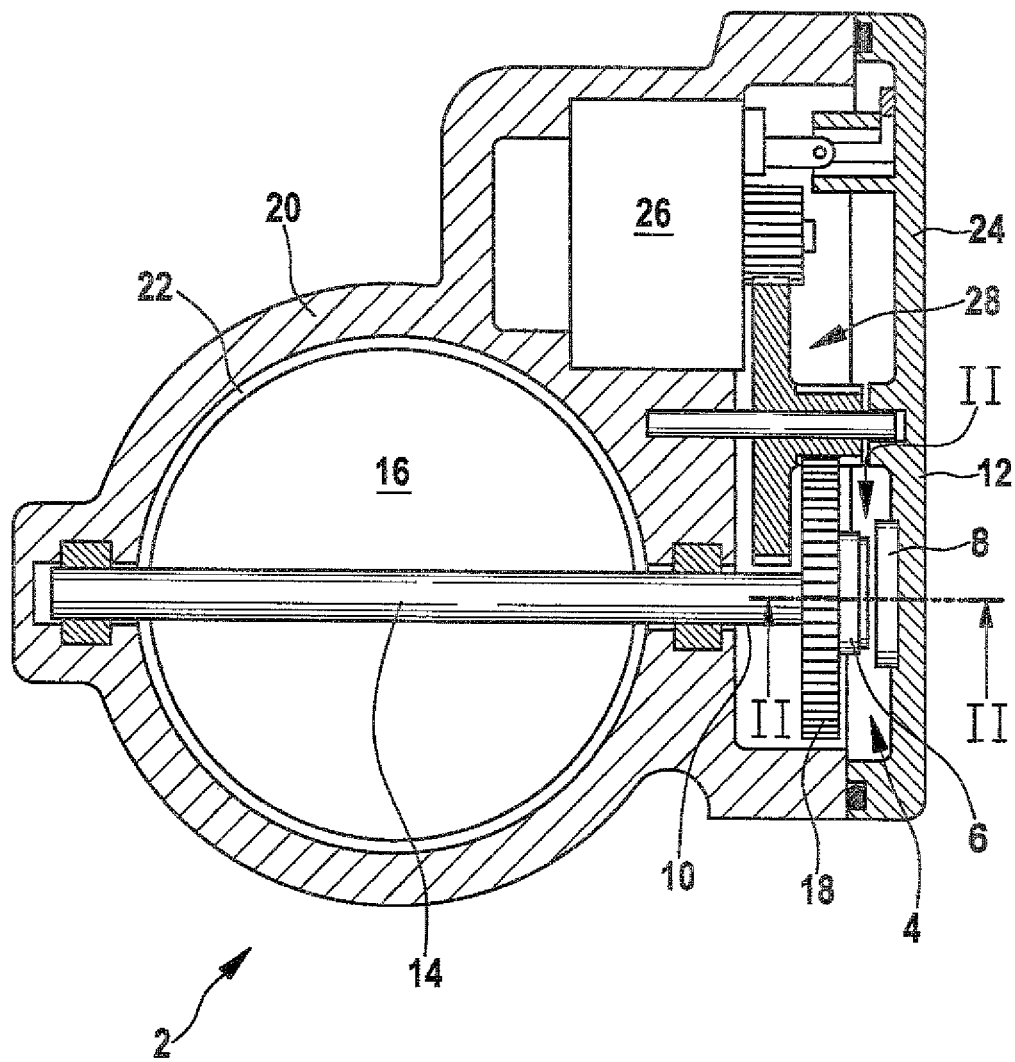
FIG. 1 shows a first exemplary embodiment of an actuator having a rotation angle sensor according to the invention.

FIG. 1 shows an actuator 2 equipped with a rotation angle sensor 4. The rotation angle sensor 4 includes a first sensor part 6 and a second sensor part 8. In the exemplary embodiment shown, the first sensor part 6 is part of a rotatably supported rotor 10. The second sensor part 8 is part of a stator 12. In the exemplary embodiment shown, the rotor 10 essentially includes a throttle element shaft 14, a throttle element 16 fastened to the throttle element shaft 14 for co-rotation, and a rotation element 18 fastened to it for co-rotation. The stator 12 essentially includes a throttle element housing 20 with a gas conduit 22, which extends through the throttle element housing 20, and a housing cover 24.

The actuator 2 has an actuator motor 26 for producing an actuation force and a transmission for transmitting the actuating force from the actuator motor 26 to the rotation element 18 of the rotor 10. The actuating force is transmitted from the actuator motor 26 to the rotor 10 in the form of torques.

Figure 2:
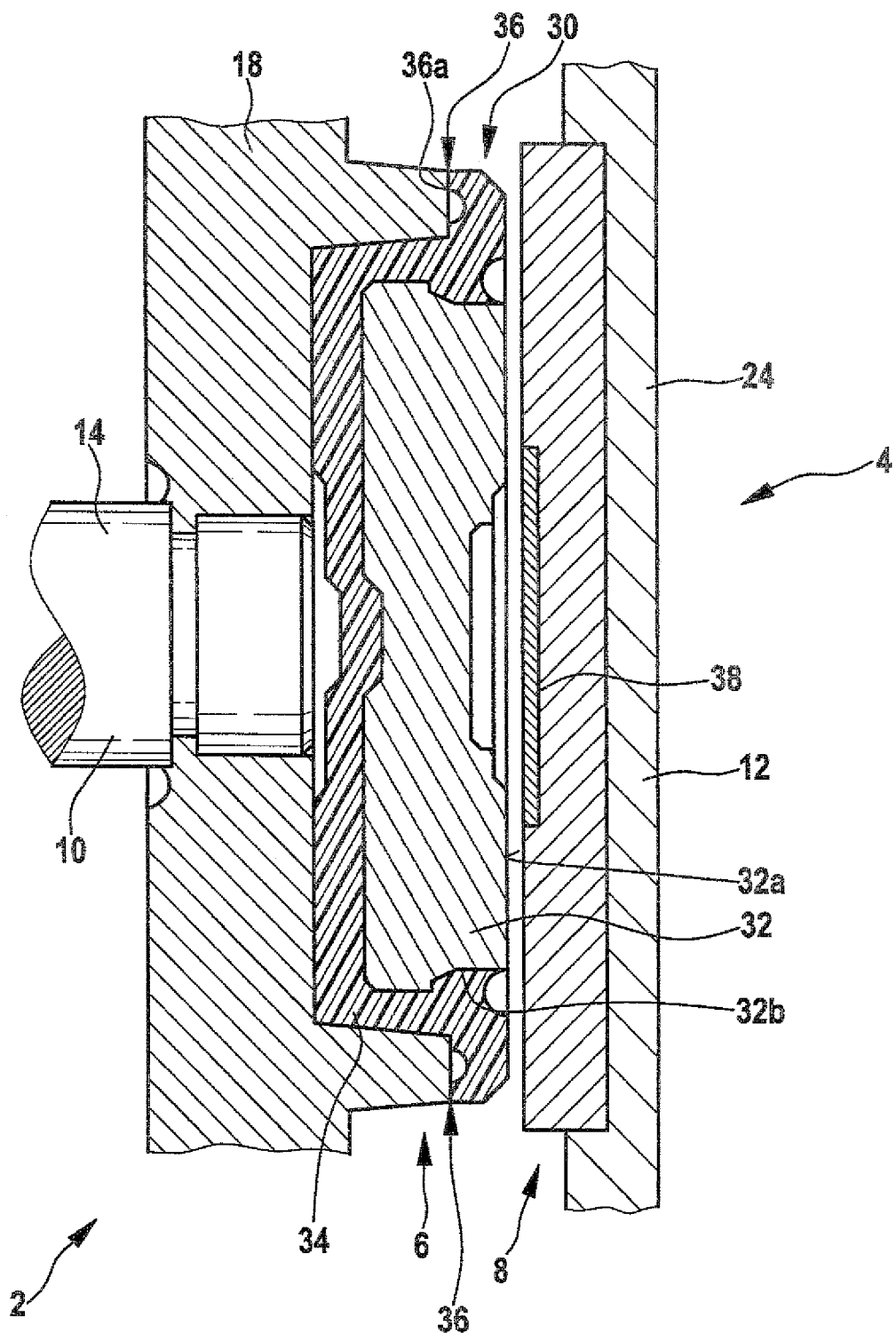
FIG. 2 shows a detail of the actuator of FIG. 1 at a different scale.

A detail of the actuator 2 shown in FIG. 1 is depicted in FIG. 2 at an enlarged scale and in a sectional view along the rotation axis of the rotor 10. The plane of the section shown in FIG. 2 is marked with II-II in FIG. 1.

In all of the figures, parts that are the same or function in the same manner have been provided with the same reference numerals. Provided that nothing to the contrary is mentioned or shown in the drawing, that which is mentioned and depicted in connection with one of the figures also applies to the other exemplary embodiments.

The first sensor part 6 includes a blank 30. The blank 30 is essentially composed of the magnet 32 and a plastic casing 34.

The magnet 32 is positioned a slight distance apart from the second sensor part 8. The magnet 32 has a side 32a oriented toward the second sensor part 8. Toward the side 32a, the magnet 32 has one indentation 32b or several indentations 32b along its circumference.

The blank 30 including the magnet 32 and the plastic casing 34 can be manufactured separately on a machine especially provided for this purpose. The blank 30 is manufactured by inserting the magnet 32 into an injection mold and then injection-molding a plastic material around it. In the process of this, the plastic material travels into the indentation 32b provided in the magnet 32. This produces an intimate, fatigue-resistant, in particular co-rotating connection between the magnet 32 and the plastic casing 34. The blank 30 can be manufactured so that there is no plastic material on the side 32a oriented toward the second sensor part 8 but instead, the magnet 32 extends to the surface of the blank 30 on the side 32a. This achieves the smallest possible distance between the magnet 32 and the second sensor part 8.

A fastening point 36a is provided on the plastic casing 34 of the blank 30. By means of the fastening point 36a, a connection 36 is produced between the blank 30 and the rotation element 18 of the rotor 10. In the exemplary embodiment shown, the fastening point 36a is a circumferential end surface oriented toward the rotation element 18. The fastening point 36a of the blank 30 can, for example, be attached to the rotation element 18 by means of glue, ultrasonic welding, laser welding, friction welding, or another known fastening method. An integrally joined, form-locked, or nonpositive, frictional connection 36 can be provided.

The second sensor part 8 on the stator 12 includes a magnetically sensitive element 38. The magnetically sensitive element 38 can be used to sense the strength of a magnetic field and/or the direction of a magnetic field. The element 38 emits an electrical signal as a function of the magnetic field acting on the magnetically sensitive element 38 and/or as a function of the direction of the magnetic field. The rotation angle sensor 4 can thus be used to measure the relative rotation angle position between the first sensor part 6 and the second sensor part 8.

The proposal is made to manufacture the blank 30 so that in lieu of a finished magnet, an as yet unmagnetized material suitable for producing a permanent magnet is provided with the plastic casing 34. Only after the blank 30 has been attached to the rotation element 18 by means of the fastening point 36a and after all of the material-removing machining of the actuator 2 has been completed is the magnetizable material constituting the magnet 32 permanently magnetized by means of a powerful external magnetic field applied to the side 32a.

Figure 3:
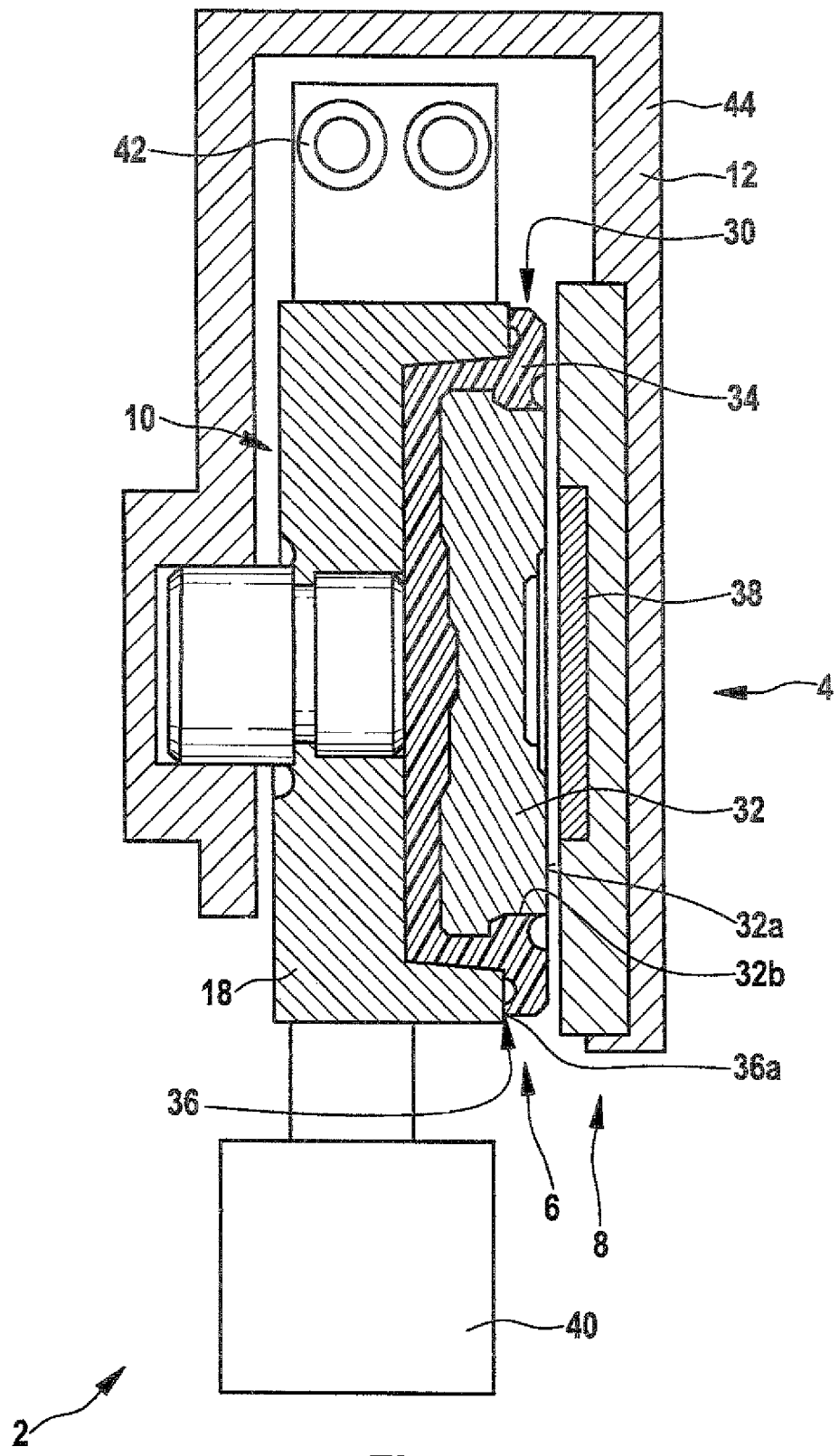
FIG. 3 shows another exemplary embodiment of an actuator according to the invention.

FIG. 3 shows another exemplary embodiment of an actuator embodied according to the invention.

Provided that nothing to the contrary is mentioned or shown in the drawings, the details of the various exemplary embodiments can be combined with one another.

In the exemplary embodiment of an actuator 2 shown in FIG. 3, which is embodied in the form of a gas pedal, the rotation element 18 is connected to a lever 40. By pressing on the lever 40, a driver of a vehicle can produce an actuating force. The actuating force moves the two sensor parts 6, 8 in relation to each other. By means of the lever 40, the driver can move the rotation element 18 and therefore the first sensor part 6 from an unactuated position into an actuated position. It is possible to rotate the first sensor part 6 by means of the manually actuatable lever 40 through. A return spring action likewise acting on the rotation element 18 provides a continuous return force for moving the rotation element 18 into the unactuated position. In the exemplary embodiment shown, the second sensor part 8 provided on the stator 12 constitutes a pedal housing. the rotation element 18 and therefore the first sensor part 6 from an unactuated position into an actuated position. A return spring action 40 likewise acting on the rotation element 18 provides a continuous return force for moving the rotation element 18 into the unactuated position. In the exemplary embodiment shown, the second sensor part 8 provided on the stator 12 constitutes a pedal housing.

The actuator 2 with the two sensor parts 6, 8 that are movable in relation to each other can be embodied in different ways. The actuator 2 can, for example, be a throttle valve assembly, an electrically adjustable regulating valve, or an actuator in an air-conditioning system, or the actuator 2 can be embodied so that it can be used to control a heat distribution in an internal combustion engine, as a wiper drive unit, as a power window unit, as a power seat adjustment unit, etc.

In the preferably selected exemplary embodiments shown, the second sensor part 8 with the magnetically sensitive element 38 is situated on the stator 12 and the first sensor part 6 with the blank 30 is situated on the rotor 10. This can, however, also be reversed. Depending on suitability of the routing of electrical lines to the magnetically sensitive element 38, it can be advantageous to provide the magnetically sensitive element 38 either on the stator 12 or on the rotor 10.

The foregoing relates to the preferred exemplary embodiments of the invention, it being understood that other variants and embodiments thereof are possible within the spirit and scope of the invention, the latter being defined by the appended claims.

The invention claimed is:

1. An actuator with a rotation angle sensor, comprising:
    a first sensor part equipped with a magnet having at least one indentation extending inwardly from an outer circumference of the magnet;
    a second sensor part equipped with a magnetically sensitive element, the first sensor part and the second sensor part being configured to rotate in relation to each other in response to an actuating force; and
    a plastic casing injection-molded at least partially around the magnet such that the plastic casing engages the at least one indentation to fixedly connect the plastic casing to the magnet and prevent rotation of the plastic casing relative to the magnet.

2. The actuator as recited in claim 1, wherein the plastic casing is at least partially open on at least one side.

3. The actuator as recited in claim 2, wherein together with the plastic casing, the magnet constitutes a separately manufacturable blank.

4. The actuator as recited in claim 3, wherein the plastic casing is connected to the first sensor part by means of an integrally joined connection.

5. The actuator as recited in claim 3, wherein the plastic casing is connected to the first sensor part by means of a form-locked connection.

6. The actuator as recited in claim 1, wherein the plastic casing is closed on all sides.

7. The actuator as recited in claim 1, wherein together with the plastic casing, the magnet constitutes a separately manufacturable blank.

8. The actuator as recited in claim 1, wherein the plastic casing is connected to the first sensor part by means of an integrally joined connection.

9. The actuator as recited in claim 8, wherein the plastic casing is connected to the first sensor part by means of a nonpositive, frictional connection.

10. The actuator as recited in claim 1, wherein the plastic casing is connected to the first sensor part by means of a form-locked connection.

11. The actuator as recited in claim 1, wherein the first sensor part is associated with a rotor and the second sensor part is associated with a stator.

12. The actuator as recited in claim 1, wherein the first sensor part is associated with a stator and the second sensor part is associated with a rotor.

13. The actuator as recited in claim 1, wherein the first sensor part is connected for co-rotation to a throttle element that controls a flow of a fluid.

14. The actuator as recited in claim 1 further comprising:
    a manually actuated lever,
    wherein the first sensor part is rotated by actuation of the manually actuated lever.

15. The actuator as recited in claim 1, wherein the plastic casing defines a first exterior surface on a side oriented toward the second sensor part, the magnet defines a second exterior surface on a side oriented toward the second sensor part, and the second exterior surface of the magnet is generally coplanar with the first exterior surface of the plastic casing.

16. A rotation angle sensor comprising:
  a first sensor part equipped with a magnet having at least one indentation extending inwardly from an outer circumference of the magnet;
  a second sensor part equipped with a magnetically sensitive element, the two sensor parts being configured to rotate in relation to each other in response to an actuating force; and
  a plastic casing injection-molded at least partially around the magnet such that the plastic casing engages the at least one indentation to fixedly connect the plastic casing to the magnet and prevent rotation of the plastic casing relative to the magnet.

17. The rotation angle sensor as recited in claim 16, wherein the plastic casing defines a first exterior surface on a side oriented toward the second sensor part, the magnet defines a second exterior surface on a side oriented toward the second sensor part, and the second exterior surface of the magnet is generally coplanar with the first exterior surface of the plastic casing.

\* \* \* \* \*